(12) United States Patent
Mitsuyoshi

(10) Patent No.: US 7,664,627 B2
(45) Date of Patent: Feb. 16, 2010

(54) INSPIRATIONAL MODEL DEVICE, SPONTANEOUS EMOTION MODEL DEVICE, AND RELATED METHODS AND PROGRAMS

(75) Inventor: Shunji Mitsuyoshi, Shinagawa-ku (JP)

(73) Assignee: A.G.I. Inc., Tokyo (JP)

( * ) Notice: Subject to any disclaimer, the term of this patent is extended or adjusted under 35 U.S.C. 154(b) by 816 days.

(21) Appl. No.: 10/530,236

(22) PCT Filed: Oct. 2, 2003

(86) PCT No.: PCT/JP03/12669

§ 371 (c)(1),
(2), (4) Date: Apr. 4, 2005

(87) PCT Pub. No.: WO2004/032045

PCT Pub. Date: Apr. 15, 2004

(65) Prior Publication Data

US 2006/0167694 A1    Jul. 27, 2006

(30) Foreign Application Priority Data

Oct. 4, 2002   (JP) .............................. 2002-292873

(51) Int. Cl.
*G06N 3/00* (2006.01)
*G06N 5/00* (2006.01)
*G06N 7/00* (2006.01)

(52) U.S. Cl. ................... 704/1; 706/45; 706/55
(58) Field of Classification Search ................ 704/1, 704/10; 706/46, 51, 52, 61, 45, 55
See application file for complete search history.

(56) References Cited

U.S. PATENT DOCUMENTS 6,035,288 A * 3/2000 Solomon .................. 705/37
6,185,534 B1 * 2/2001 Breese et al. ............... 704/270

(Continued)

FOREIGN PATENT DOCUMENTS

JP    HEI 11-265239    9/1999

(Continued)

OTHER PUBLICATIONS

Friedrich Beck and John C. Eccles, Quantum aspects of brain activity and the role of consciousness, Biophysics, Dec. 1992, pp. 11357-11361, vol. 89, Proc. Natl. Acad. Sci. USA.

(Continued)

*Primary Examiner*—Martin Lerner
(74) *Attorney, Agent, or Firm*—Greensfelder, Hemker & Gale, P.C.; Peter S. Gilster

(57) ABSTRACT

An inspiration model device according to the invention is provided with a spontaneous emotion unit, a knowledge database, and a conception unit. The spontaneous emotion unit prepares, as data, plural emotion states in advance, which are obtained by modeling human emotions, and causes state transitions to occur repeatedly between the emotion states according a stochastic model of the Schrödinger equation. The knowledge database simulates a human inspiration source that is influenced by sensibility by classifying externally collected knowledge data depending on the degrees of correlation with the emotion states, and accumulates the knowledge data. When receiving an external input, the conception unit simulates human conception by combining the external input with an emotion state of the spontaneous emotion unit and searching the knowledge database for related knowledge data using, as a search key, the combination or the like.

6 Claims, 3 Drawing Sheets

U.S. PATENT DOCUMENTS

| | | | |
|---|---|---|---|
| 6,212,502 B1* | 4/2001 | Ball et al. | 704/270 |
| 6,249,780 B1* | 6/2001 | Mizokawa | 706/23 |
| 6,292,688 B1* | 9/2001 | Patton | 600/544 |
| 6,418,435 B1 | 7/2002 | Chase | |
| 6,430,523 B1* | 8/2002 | Mizokawa | 702/182 |
| 6,446,056 B1* | 9/2002 | Sadakuni | 706/14 |
| 6,594,649 B2* | 7/2003 | Sadakuni | 706/14 |
| 6,629,242 B2* | 9/2003 | Kamiya et al. | 713/100 |
| 6,901,390 B2* | 5/2005 | Mizokawa | 706/14 |
| 7,340,393 B2* | 3/2008 | Mitsuyoshi | 704/207 |
| 7,451,079 B2* | 11/2008 | Oudeyer | 704/205 |
| 7,457,752 B2* | 11/2008 | Oudeyer | 704/258 |
| 2002/0069036 A1* | 6/2002 | Mizokawa | 702/182 |
| 2002/0133347 A1* | 9/2002 | Schoneburg et al. | 704/257 |
| 2003/0040911 A1* | 2/2003 | Oudeyer | 704/266 |
| 2003/0055654 A1* | 3/2003 | Oudeyer | 704/275 |
| 2004/0002790 A1* | 1/2004 | Senn | 700/246 |
| 2007/0196797 A1* | 8/2007 | Mitsuyoshi | 434/236 |

FOREIGN PATENT DOCUMENTS

| | | |
|---|---|---|
| JP | 2001-154707 | 6/2001 |
| JP | 2001-212783 | 8/2001 |
| JP | 2002-215183 | 7/2002 |
| WO | WO 02/23524 | 3/2002 |

OTHER PUBLICATIONS

Izumi Kohno, Ryoji Ikebe, Sanae Wake, Shin'Ichi Uwakubo, Toru Iwasawa, and Kenshi Nishimura, Emotional dialogue system using animated agent with emotional behavior, System overview and emotion model, Proceedings of the National Academy of Sciences of the United States of America, Dec. 1, 1992, pp. 43-48, vol. 89, No. 23, USA.

P.J. Gmytrasiewics, C.L. Lisetti: "Emotions and personality in agent design and modeling" [Online] 2001, pp. 1-8, XP002443979, URL: http://citeseer.ist.psu.edu/503411.html, cols. 2,6,7,8,9,10, col. 11, lines 9-11.

P. Pearl: "Collapse models" ARXIV.ORG, Quantum Physics, [Online] Jan. 29, 1999, pp. 1-36, XP002443981, URL: http//arxiv.org/abs/quant-ph/9901077v1, Section 2.

T. Musha, Y. Terasaki, H.A. Haque, G.A. Ivanitsky: "Feature extraction from EEGs associated with emotions" Artificial Life and Robotics, [Online] vol. 1, No. 1, Mar. 1997, pp. 15-19, XP002443982 ISSN: 1614-7456, URL: http://dx.doi.org/10.1007/BF02471106, col. 2, lines 4-19, col. 3, lines 14-17, col. 3, lines 32-37, col. 4, from "The magnitudes of these components ( . . . )" to "( . . . ) was regarded as its level".

Y. Liu: "Neurons, psychons, and emotion" Proceedings of the SPIE, Applications and Science of Artificial Neural Networks, [Online] vol. 2492, Apr. 1995, pp. 184-198, XP002443980, URL: http//dx.doi.org/10.1117/12.205128.

\* cited by examiner

QUANTIZATION LEVELS OF FUNDAMENTAL EMOTIONS

| | JOY | ANGER | SORROW | AFFEC-TION | HATRED | SURPRISE | FEAR |
|---|---|---|---|---|---|---|---|
| WEAK | 0 | 0 | 0 | 0 | 0 | 0 | 0 |
| | 1 | 1 | 1 | 1 | 1 | 1 | 1 |
| | 2 | 2 | 2 | 2 | 2 | 2 | 2 |
| | 3 | 3 | 3 | 3 | 3 | 3 | 3 |
| STRONG | 4 | 4 | 4 | 4 | 4 | | 4 |
| | 5 | | | 5 | | | |

INSPIRATIONAL MODEL DEVICE, SPONTANEOUS EMOTION MODEL DEVICE, AND RELATED METHODS AND PROGRAMS

CROSS-REFERENCE TO RELATED APPLICATIONS

This application is a United States national stage of PCT International Application No. PCT/JP03/12669, and is based upon and claims the benefit of priority from Japanese Patent Application No. 2002-292873, filed on Oct. 4, 2002, the entire contents of which are incorporated herein by reference.

BACKGROUND OF THE INVENTION

1. Field of the Invention

The present invention relates to an inspiration model device for simulating human conception and a related method and program.

The invention also relates to a spontaneous emotion model device that is the main part of the above inspiration model device, and a related method and program.

In particular, the invention relates to a technique that is applied to the following product fields etc.:

(1) Question and answer systems that use a computer or a robot and are improved in naturalness.

(2) Idea search systems capable of reflecting sensibility as humans possess.

(3) Experimental models of a human psychological state.

(4) Game systems capable of expressing emotions and motions in a more human-like manner.

(5) Agent systems.

(6) Information search methods capable of retrieving an appropriate answer at high speed from an information source having an enormous amount of information utilizing conception (what is called intuition) by a spontaneous emotion.

2. Description of the Related Art

One conventional technique relating to the invention is "Emotion Generation Device and Emotion Generation Method" that is disclosed in Patent document 1 (Japanese Unexamined Patent Application Publication No. 11-265239). The emotion representing the internal state of a human, for example, varies in a variety of manners depending on the situation. Patent document 1 discloses a technique for realizing generation of an emotion in an unpredictable situation. More specifically, an emotion of a device itself is generated by evaluating a situation in the light of a predictable situation. Further, emotions that occurred actually in the past and associated situations are analyzed, whereby unpredictable incidental conditions specific to the respective situations and corresponding emotions are learned. If a newly input situation satisfies a learned incidental condition, the emotion corresponding to that incidental condition is output.

The present inventor disclosed "Sensibility Generation Method, Sensibility Generation Device, and Software" in Patent document 2 (Japanese Unexamined Patent Application Publication No. 2002-215183). In this conventional technique, instinct parameters representing the degrees of comfort, danger, and achievement are generated as motivation information on the basis of input information such as emotion states of a dialog partner, and a fundamental emotion such as joy or anger is generated and controlled on the basis of the generated instinctive motivation information. In particular, this conventional technique succeeded in generating an emotion state that is closer to one human will have by allowing the control rules (tendency in terms of humans) of the generation and control of a fundamental emotion to reflect personalities such as reason and will.

Incidentally, the human brain is considered a big parallel processing machine consisting of a very large number of neurons. As a result, a problem solution by the brain is recognized as a check-everything-basis information search process by parallel processing.

However, realization of such a check-everything-basis information search process by a computer or the like is associated with various problems; for example, an enormous search dictionary needs to be prepared and a very long search time is necessary. Further, a check-everything-basis information search merely finds, from a search range, an average solution that satisfies prescribed search conditions and cannot output an unexpected solution (brainstorm).

The human brain has a rare ability of producing a brainstorm, which is of a different nature than the abilities of the check-everything-basis information search process.

SUMMARY OF THE INVENTION

In making the present invention, the inventor tried to solve the problems of the above-described check-everything-basis information search process by paying attention to the brainstorm which is a psychological phenomenon.

That is, an object of the invention is to realize an effective information search (in other words, a conception operation that is close to human conception) by adding a process that is similar to a brainstorm.

Another object of the invention is to realize a spontaneous emotion model for realizing sensibility or an emotional fluctuation that is necessary for producing a brainstorm.

The invention will be described below.

[1]

An inspiration model device according to the invention includes a spontaneous emotion unit, a knowledge database, and a conception unit.

The spontaneous emotion unit prepares, as data, a plurality of emotion states in advance, which is obtained by modeling human emotions, and causes state transitions to occur repeatedly between the emotion states according to an operation process representing a stochastic model of the Schrödinger equation. As a result, the spontaneous emotion unit simulates creation of a human spontaneous emotion.

The knowledge database simulates a human inspiration source, which is influenced by sensibility, by classifying externally collected knowledge data depending on the degrees of correlation with the emotion states and accumulating the knowledge data.

When receiving an external input, the conception unit combines the external input with an emotion state of the spontaneous emotion unit and searches the knowledge database for related knowledge data using, as a search key, the combination or a state of interference produced by the combination. As a result, the conception unit simulates human conception.

The above inspiration model device will be described below.

First, to model conception called a brainstorm, the present inventor conceived the following theory. The brainstorm is an uncertain psychological phenomenon that is difficult to control under surface consciousness. The uncertainty of the brainstorm is considered due to the fact that it is strongly influenced by sensibility and an emotional fluctuation as bases of a thought.

In view of the above, in the invention, the spontaneous emotion unit was developed first to simulate an emotional fluctuation. To construct the spontaneous emotion unit, emotion states are set that are obtained by modeling human emotions. The respective emotion states can be recognized as a moving body that moves in a virtual coordinate space (hereinafter referred to as "emotion space") having fundamental emotions such as joy, anger, sorrow, and pleasantness. That is, the positions of emotion states in this coordinate space are considered emotion potentials (i.e., the degrees of joy, anger, sorrow, and pleasantness). The momentum of the emotion state in this coordinate space is considered the momentum of a variation of the human emotion.

If a movement of the emotion state is considered a completely random movement, an inconsistent emotion variation will occur, which will not lead to a rational and consistent brainstorm.

Conversely, if a movement of the emotion state is a movement according to the Newtonian mechanics, an emotion variation can be predicted completely and hence will not lead to a brainstorm having uncertainty.

In view of the above, to realize a proper level of uncertainty that is necessary for producing a brainstorm, the inventor paid attention to the Schrödinger equation. More specifically, plural quantized emotion states are assumed in advance and settings are made so that state transitions occur between those emotion states so as to satisfy probabilities of existence that are represented by the square of a wave function $\psi$ of a Schrödinger equation.

For example, a motion of the emotion state can be calculated by using a wave function, Fourier transform, matrix mechanics, path integrals, creation/annihilation operators, operators, differential equations, exchange relationships, or some other known operation process.

Incidentally, the employment of a Schrödinger equation makes it possible to express the emotion state not only by utilizing its particle nature (i.e., the position and momentum in the emotion space) but also by utilizing its wave nature. The employment of a Schrödinger equation is favorable also in that the utilization of the wave nature of the emotion state enables a simulation of creation and annihilation of a human emotion, interference between emotions, resonance of emotions, and like phenomena.

Then, the inventor developed the knowledge database as an inspiration source of a brainstorm. Usually, humans use, as an inspiration source, an accumulation of knowledge and experiences. However, it is not considered that a human has done a check-everything-basis search on the entire inspiration source when he or she has a brainstorm. This is because such a check-everything-basis search can produce only an average, natural answer and always requires an enormous thinking time. Both results are contradictory to a brainstorm.

In view of the above, the inventor thought that a human restricts the inspiration source properly when he or she has a brainstorm. Restricting the inspiration source increases the probability that a non-average, unexpected answer is obtained from a restricted range. Further, since the inspiration source is restricted to a narrow range, the thinking time required for an information search can be made so short that it can be called an intuition.

The restrictive action of the intelligence that is based on knowledge and experiences is also important to the range restriction of the inspiration source. However, whereas the range restriction by the intelligence is effective in increasing the probability that an information search gives a correct answer and shortening the thinking time, it is insufficient to obtain an unexpected answer. In particular, the mere range restriction by the intelligence can never explain a brainstorm of an artist which can be called a revelation.

In view of the above, the inventor paid attention to the fact that artists do creative activities attaching importance to sensibility and emotions, and thought that the inspiration range is restricted unconsciously by sensibility and emotions.

To realize such a function, the knowledge database of the invention classifies externally collected knowledge data in such a manner that they are correlated with the degrees of correlation with the emotion states, and accumulates the knowledge data. Such classification and accumulation make it possible to simulate a human inspiration source that is influenced by sensibility and emotions.

Further, the inventor developed the conception unit as a place where to produce a brainstorm. The conception unit acquires an emotion state from the spontaneous emotion unit. The conception unit is also given an external input (stimulus) as a trigger for a brainstorm.

The conception unit combines the external input with an emotion state. The conception unit searches the knowledge database using the combination as a search key, whereby the search range is restricted by the emotion state. The restriction of the search range makes it possible to obtain an unexpected search result at high speed that conforms to the emotion state.

The conception unit may generate a search key by taking into consideration a state of interference that is produced by a combination of the external input and the emotion state. This is an operation that the external input is modified by the emotion state and then a search key is newly generated.

A simple example is as follows. An external input "rose" and an emotion state "great joy" interfere with each other in such a direction as to strengthen each other. This state of interference modifies mere "rose" to a search key "red rose" which is more magnificent. (Specific modification rules can be determined by psychological experiments, for example. For example, emotion states of subjects are estimated by a Rorschach test and then the subjects are requested to fill out a questionnaire, that is, to answer how they construed external inputs in those emotion states.)

This means a simulation of an activity that a human construes an external input (e.g., a story told by another person) in his or her own way depending on his or her sensibility and emotion. In this case, a search key that is compatible with human feelings can be generated that includes an original construction (in favorable terms) or a self-righteous construction (in unfavorable terms). Modifying a search key under influence of an emotion state makes it possible to perform, in a simulated manner, an operation that is even closer to a human brainstorm.

As a further alternative, the conception unit may recognize, as a wave, an external input that is given continuously, determine a state of interference between the external input and an emotion state, and search the knowledge database using the state of interference as a search key. This corresponds to an operation that a search key is generated from a variation that is newly produced by interference or synchronization between the external input and the emotion state (in terms of humans, a rise and a fall of a mood, a beat of sensibility, or the like). In this case, a search result can be obtained that cannot be expected from the contents of the external input though they are identical in the sensibility level.

[2]

It is preferable that the conception unit of the invention includes a surface storage unit and a deep consciousness updating unit.

The surface storage unit stores the combination of the external input and the emotion state for a predetermined period and forgets the combination after the predetermined period has elapsed.

On the other hand, the deep consciousness updating unit simulates growth of deep consciousness by increasing probabilities of state transitions to the emotion state of the spontaneous emotion unit when the external input or the state of interference corresponds to "encouragement" and decreasing the probabilities of state transitions when the external input or the state of interference corresponds to "suppression", when a frequency, with which combinations of an external input and an emotion state stored in the surface storage unit are occurred, becomes greater than or equal to a prescribed value.

As described above, the spontaneous emotion unit of the invention simulates growth of deep consciousness (i.e., gives a tendency to the spontaneous emotion unit) by changing the state transition probabilities of the spontaneous emotion. Such growth makes it possible to realize a spontaneous emotion unit that is higher in individuality such as a moderate spontaneous emotion unit or an excitable spontaneous emotion unit.

However, since this feature relates to the individuality of the spontaneous emotion unit, it is not preferable to easily cause its growth. Therefore, in the invention, growth is caused (i.e., the state transition probabilities are changed) only when the frequency of combinations of an external input and an emotion state has become greater than or equal to the prescribed value.

The probabilities of state transitions to the emotion state are increased when the external input or the state of interference corresponds to "encouragement." Conversely, the probabilities of state transitions to the emotion state are decreased when the external input or the state of interference corresponds to "suppression." Directing growth in this manner makes it possible to promote growth in such a manner that it harmonizes with external inputs.

As for the encouragement/suppression judgment, it is preferable that a teacher such as a system developer determines rules from the viewpoint of education of the spontaneous emotion unit.

The above-described growth (i.e., giving of a tendency to the spontaneous emotion unit) makes it possible to perform, in a simulated manner, a conception operation that is high in individuality and close to human conception.

[3]

A spontaneous emotion model device according to the invention includes a spontaneous emotion unit, a surface storage unit, and a deep consciousness updating unit.

The spontaneous emotion unit that prepares, as data, a plurality of emotion states in advance, which is obtained by modeling human emotions, and simulates creation of a human spontaneous emotion by causing state transitions to occur repeatedly between the emotion states according to an operation process representing a stochastic model of the Schrödinger equation.

The surface storage unit captures, as an external input, a direct or indirect external reaction to an emotion state, and stores a combination of the external input and the emotion state for a predetermined period and forgets the combination after the predetermined period has elapsed.

The deep consciousness updating unit simulates growth of deep consciousness by increasing probabilities of state transitions to the emotion state of the spontaneous emotion unit when the external input or a state of interference of the combination corresponds to "encouragement" and decreasing the probabilities of state transitions when the external input or the state of interference corresponds to "suppression" when a frequency of combinations of an external input and an emotion state stored in the surface storage unit becomes greater than or equal to a prescribed value.

This spontaneous emotion model device is constructed by extracting the spontaneous emotion unit and the parts relating to its growth from the above-described inspiration model device. Using this spontaneous emotion model device as a functional component makes it possible to add the functions of creation and growing of a spontaneous emotion to various application products.

[4]

An inspiration simulation method according to the invention causes a computer to execute the steps of:

(a) preparing, in advance, as data, a plurality of emotion states obtained by modeling human emotions and simulating creation of a human spontaneous emotion by causing the computer to repeatedly perform operations of state transitions between the emotion states according to an operation process representing a stochastic model of the Schrödinger equation;

(b) simulating a human inspiration source that is influenced by sensibility by classifying externally collected knowledge data in such a manner that they are correlated with degrees of correlation with the emotion states and accumulating the knowledge data in a database on the computer; and (c) when an external input is received, simulating human conception by causing the computer to combine the external input with an emotion state and to search the database for related knowledge data using, as a search key, the combination or a state of interference produced by the combination.

This inspiration simulation method corresponds to a method-category claim that describes the inspiration procedure that the inspiration model device of item [1] follows.

[5]

It is preferable that the inspiration simulation method according to the invention further includes the step of:

(d) simulating growth of deep consciousness by causing the computer to increase probabilities of state transitions to the emotion state when the external input or the state of interference corresponds to "encouragement" and to decrease the state transition probabilities when the external input or the state of interference corresponds to "suppression" when the computer judges that a frequency of combinations of an external input and an emotion state is greater than or equal to a prescribed value.

This inspiration simulation method corresponds to a method-category claim that describes the inspiration procedure that the inspiration model device of item [2] follows.

[6]

A spontaneous emotion simulation method according to the invention causes a computer to execute the steps of:

(A) preparing, in advance, as data, a plurality of emotion states obtained by modeling human emotions and simulating creation of a human spontaneous emotion by causing the computer to repeatedly perform operations of state transitions between the emotion states according to an operation process representing a stochastic model of the Schrödinger equation;

(B) causing the computer to capture, as an external input, a direct or indirect external reaction to an emotion state, and to store a combination of the external input and the emotion state for a predetermined period and forget the combination after the predetermined period has elapsed; and (C) simulating growth of deep consciousness by causing the computer to increase probabilities of state transitions to the emotion state when the external input or a state of interference of the combination corresponds to "encouragement" and to decrease the state transition probabilities when the external input or the state of interference corresponds to "suppression" when the computer judges that a frequency of combinations of an external input and an emotion state is greater than or equal to a prescribed value.

This spontaneous emotion simulation method corresponds to a method-category claim that describes the procedure that the spontaneous emotion model device of item [3] follows.

[7]

A program according to the invention is a program which causes a computer to function as the spontaneous emotion unit, the knowledge database, and the conception unit that constitute the above-described inspiration model device.

The above-described inspiration model device can be implemented on a computer by causing the computer to run this program.

[8]

Another program according to the invention is a program which causes a computer to function as the spontaneous emotion unit, the surface storage unit, and the deep consciousness updating unit that constitute the above-described spontaneous emotion model device.

The above-described spontaneous emotion model device can be implemented on a computer by causing the computer to run this program.

In the invention, state transitions are caused between emotion states according to a stochastic model of the Schrödinger equation. This makes it possible to simulate an emotional fluctuation having a proper level of uncertainty to produce a brainstorm.

In the invention, knowledge data that have been collected externally are classified so as to be correlated with the degrees of correlation with emotion states and are accumulated. Such classification and accumulation makes it possible to simulate a human inspiration source that is influenced by sensibility.

Further, in the invention, an external input (stimulus) as a trigger for a brainstorm is combined with an emotion state. In the invention, knowledge data are searched by using, as a search key, the combination or a state of interference that is produced by the combination. As a result, the search range of the knowledge data is restricted in accordance with a fluctuation of the emotion state, whereby an unexpected search result can be obtained that conforms to the emotion state. This allows the conception unit to realize, in a simulated manner, an operation that is close to human conception.

As described above, the invention makes it possible to construct a system capable of outputting a conception result that is close to a result as would be obtained by a brainstorm while searching an enormous search dictionary at high speed.

BRIEF DESCRIPTION OF THE DRAWINGS

The above and other objects of the present invention will easily be understood by the following description and the accompanying drawings, in which.

DESCRIPTION OF THE PREFERRED EMBODIMENT

An embodiment of the present invention will be hereinafter described with reference to the drawings.

Figure 1:
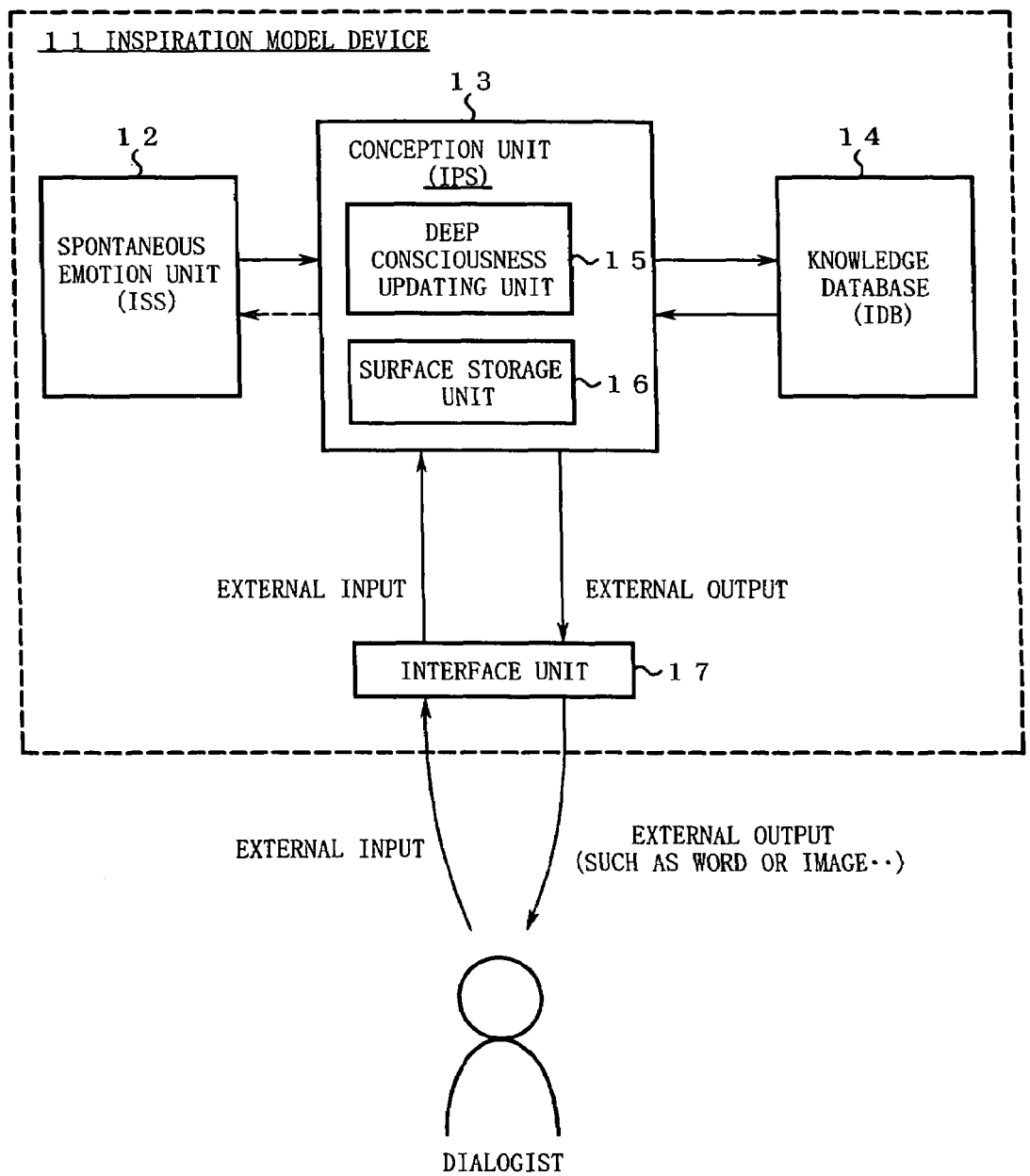
FIG. 1 is a block diagram of an inspiration model device (including a spontaneous emotion model device) according to an embodiment.

FIG. 1 is a block diagram of an inspiration model device 11 (including a spontaneous emotion model device) according to the embodiment.

As shown in FIG. 1, the inspiration model device 11 is composed of a spontaneous emotion unit 12, a conception unit 13, a knowledge database 14, and an interface unit 17. The conception unit 13 is composed of a deep consciousness updating unit 15 and a surface storage unit 16.

For example, a program may be formed by converting the operation of the inspiration model device 11 to program code. The inspiration model device 11 can be implemented on a computer by software by running this program on the computer. Alternatively, all or part of the inspiration model device 11 may be implemented by hardware.

[Initial Setting of Spontaneous Emotion Unit 12]

First, the initial setting of the spontaneous emotion unit 12 will be described.

Figures 2, 3:
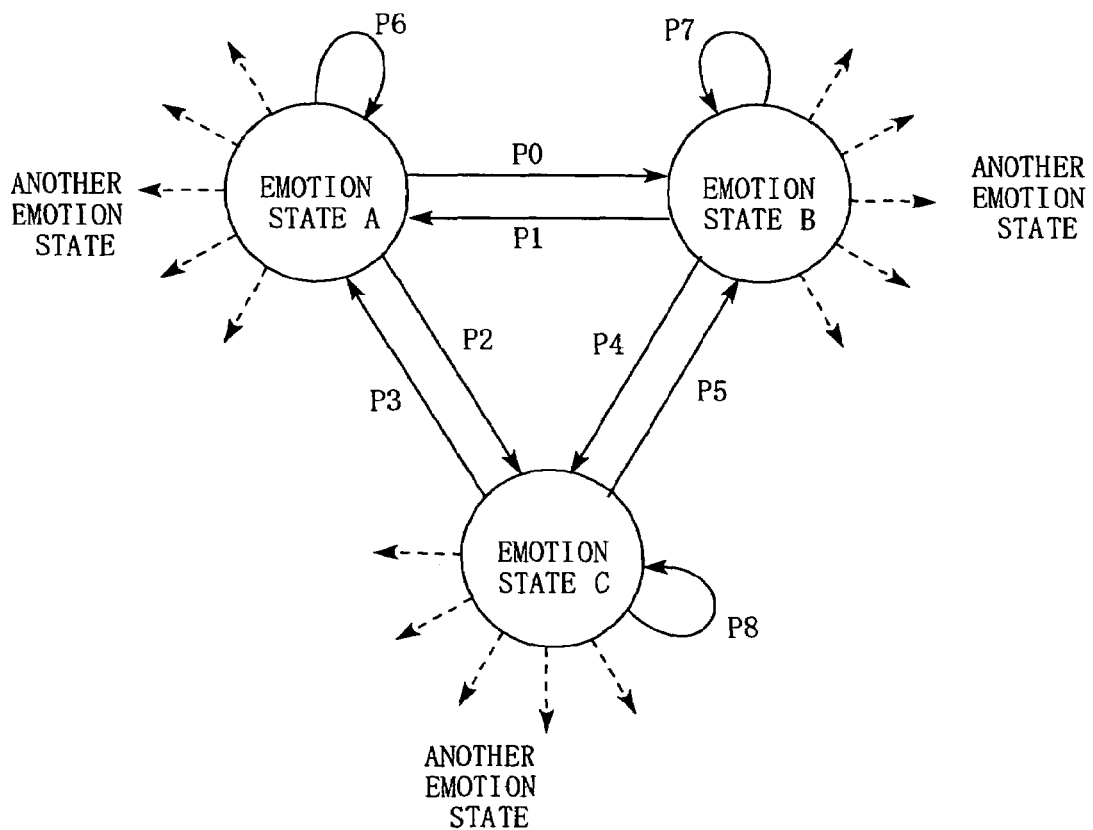
FIG. 2 shows an example of quantized fundamental emotions.
FIG. 3 illustrates how state transitions occur between emotion states.

A developer of the spontaneous emotion unit 12 selects typical fundamental emotions of humans. Then, the developer determines quantization levels of the fundamental emotions by setting strength levels of the fundamental emotions. FIG. 2 shows an example of fundamental emotions that have been determined in such a manner.

The developer defines plural emotion states that would be experienced actually by humans by combining those quantized fundamental emotions. Each of those emotion states represents a complex, realistic emotion state that is a mixture of plural fundamental emotions as exemplified by an emotion state of joy=4, anger=0, sorrow=1, affection=5, hatred=0, . . . .

Each of the thus-defined emotion states resides as a coordinate position in a coordinate space (hereinafter referred to as "emotion space") having the fundamental emotions as axes. The human emotion can be modeled as a kind of quantum presence that moves in the emotion space by making transitions between emotion states.

Next, the developer considers workings of fundamental emotions constituting each emotion state. For example, an emotion state having a strong hatred and a strong affection is very unstable because these fundamental emotions are opposite to each other. Therefore, it is highly probable that a transition to another, more stable emotion state occurs.

Further, for example, it is highly probable that an emotion state having a strong anger makes a transition to an emotion state having sorrow because the strong anger may come to cause a wave of sorrow (or resignation).

In this manner, the developer determines probabilities of existence of the respective emotion states by taking the interaction between the fundamental emotions into consideration and initially sets state transition probabilities that satisfy those probabilities of existence.

To impart quantum-mechanical uncertainty to a brainstorm operation as a final target, it is necessary that the probability of existence of each emotion state be approximately equal to the square of a wave function ψ of a Schrödinger equation. Adjustments for that purpose can be made by, for example, re-setting the quantization levels of the fundamental emotions, changing the constants of the Schrödinger equation, or re-setting the probabilities of existence themselves.

FIG. 3 illustrates state transitions according to the thus-determined state transition probabilities. FIG. 3 shows how state transitions occur between emotion states A-C etc. according to state transition probabilities P0-P8.

[Generation of Knowledge Database 14]

Next, the generation of the knowledge database 14 will be described.

How the knowledge database 14 is generated by an SD method as an exemplary method will be described below.

In the SD method, knowledge data of a sea etc. are presented to subjects and the subjects are requested to answer impressions of the knowledge data using evaluation measures of the fundamental emotions such as "pleasant to uninteresting" and "fearful to unfearful." On the basis of results obtained from plural subjects by using the SD method, the developer determines a spatial distribution of the impressions of each piece of knowledge data in the emotion space having the fundamental emotions as axes. The spatial distribution is divided into individual emotion states and sums are calculated for the respective emotion states, whereby the degrees of correlation between the knowledge data and the respective emotion states are obtained.

The developer classifies the knowledge data into emotion states each showing a strong correlation and then correlates the knowledge data with each other. A knowledge database in which influence of sensibility is taken into consideration is completed by classifying the knowledge data into emotion states and correlating the knowledge data with each other.

[Conception Operation of Inspiration Model Device 11]

Figure 4:
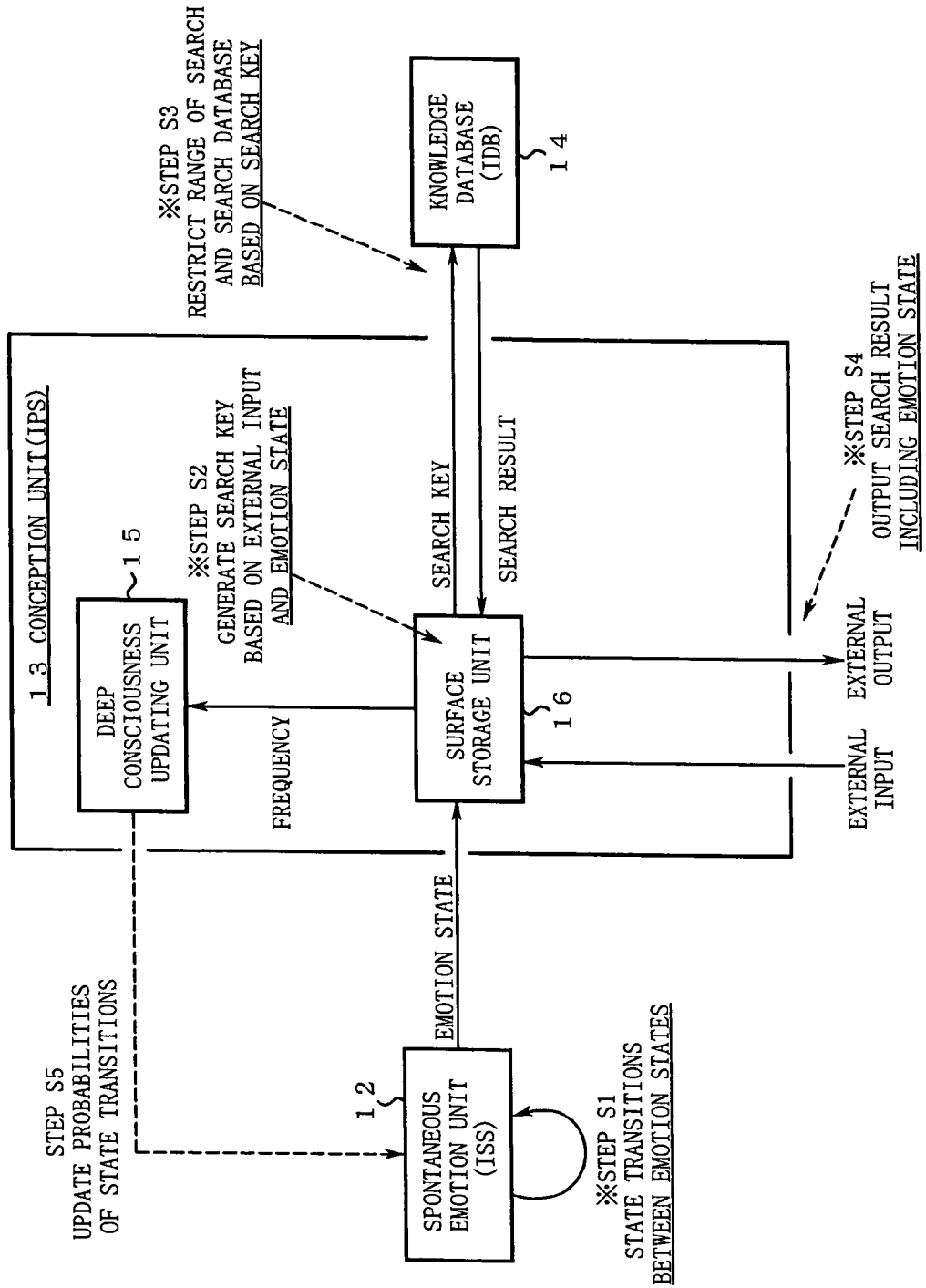
FIG. 4 illustrates a conception operation of an inspiration model device 11.

FIG. 4 illustrates the conception operation of the inspiration model device 11.

The conception operation of the inspiration model device 11 will be described below in order of step numbers shown in FIG. 4.

Step S1: The spontaneous emotion unit 12 causes sequential state transitions between plural emotion states according to preset state transition probabilities. The processing of this step is according to a stochastic model of the Schrödinger equation and hence can be performed by using a wave function, Fourier transform, matrix mechanics, path integrals, creation/annihilation operators, operators, differential equations, exchange relationships, or some other known operation process.

How a human spontaneous emotion is created can be simulated by causing sequential state transitions between emotion states in the above-described manner.

Step S2: When receiving an external input from an operator, the surface storage unit 16 acquires a current emotion state from the spontaneous emotion unit 12 and generates a combination of the external input and the emotion state. The surface storage unit 16 keeps the combination stored for a prescribed period and forgets it after the period has elapsed.

Then, the surface storage unit 16 generates a search key on the basis of the combination. At this step, selection can be made among the following search keys:

(1) The combination of the external input and the emotion state is employed as a search key as it is.

(2) A search key is generated by modifying the external input in accordance with a state of interference between the external input and the emotion state (for details, refer to the section of "Disclosure of the Invention").

(3) The state of interference between the external input and the emotion state is employed as a search key. More specifically, an emotion state showing a strong correlation with the external input is determined. Another emotion state is generated by combining the determined emotion state with the current emotion state on the wave level. To perform such combining in a simplified manner, combination levels of respective fundamental emotions of both emotion states are determined according to interaction rules of the fundamental emotions. Another, resulting emotion state is employed as a search key.

Step S3: The conception unit 13 inquires of the knowledge database 14 about the search key that was determined at step S2. First, the knowledge database 14 restricts the range of a search using the emotion states according to the search key. Then, the knowledge database 14 searches for knowledge data that relate to the external input within the restricted search range.

As a result of such an information search in response to an external input "flower," for example, search results "beautiful," "nice scent," and "young girl" will be obtained for a happy emotion state and search results "funeral," "ghost," and "strange scent" will be obtained for a gloomy emotion state.

Step S4: The conception unit 13 outputs the search results and the current emotion state. The interface unit 17 shown in FIG. 1 outputs (selects or generates) an audio output, a video output, or the like that reflects the search results and the current emotion state.

Step S5: Usually, the conception operation of the inspiration model device 11 is completed by the execution of step S4.

Step S5 is a conditional operation that is executed in the case where the frequency of combinations of an external input and an emotion state stored in the surface storage unit 16 has exceeded a prescribed value. In this case, the deep consciousness updating unit 15 judges whether the external input or the state of interference of the combination state corresponds to "encouragement" or "suppression."

When it corresponds to "encouragement," the deep consciousness updating unit 15 rewrites the settings of the spontaneous emotion unit 12 and thereby increases the probabilities of state transitions to the current emotion state.

Conversely, when it corresponds to "suppression," the deep consciousness updating unit 15 rewrites the settings of the spontaneous emotion unit 12 and thereby decreases the probabilities of state transitions to the current emotion state.

This operation of updating the spontaneous emotion unit 12 allows the spontaneous emotion unit 12 to grow in such a direction as to harmonize with external inputs.

[Advantages Etc. of Embodiment]

According to the embodiment, with the above-described operation, the search range of the knowledge database 14 can be restricted properly in accordance with the emotion state of the spontaneous emotion unit 12. As a result, an unexpected search result that conforms to an emotion state and has been influenced by a fluctuation of the emotion state can be obtained at high speed.

Further, in this embodiment, the operation of step S5 can promote growth of (i.e., giving of a tendency to) the spontaneous emotion unit 12 in such a direction that it will harmonize with external inputs, which in turn makes it possible to realize, by simulation, a conception operation that is high in individuality and is even closer to human conception.

The invention can be practiced in other various forms without departing from its spirit and essential features. Therefore, the above-described embodiment is just an example in every point and should not be construed in a restrictive manner. The scope of the invention is defined by the claims and is not limited by the specification body at all, and encompasses all changes and modifications as equivalents of the claims.

What is claimed is:

1. An inspiration model device comprising:
   a spontaneous emotion unit that prepares, as data, a plurality of emotion states in advance, which is obtained by modeling human emotions, and simulates creation of a human spontaneous emotion by causing state transitions to occur repeatedly between said emotion states according to an operation process representing a stochastic model of the Schrödinger equation;
   a knowledge database that simulates a human inspiration source, which is influenced by sensibility, by classifying externally collected knowledge data depending on degrees of correlation with said emotion states and accumulating said knowledge data; and
   a conception unit that, when receiving an external input, simulates human conception by combining said external input with one of the emotion states of said spontaneous emotion unit and searching said knowledge database for related knowledge data using, as a search key, one of the combination and a state of interference produced by the combination.

2. The inspiration model device according to claim 1, wherein said conception unit includes:
   a surface storage unit that stores the combination of said external input and the emotion state for a predetermined period and forgets the combination after said predetermined period has elapsed; and
   a deep consciousness updating unit that simulates growth of deep consciousness by
   increasing probabilities of state transitions to the emotion state of said spontaneous emotion unit when one of said external input and said state of interference corresponds to "encouragement" and
   decreasing said probabilities of state transitions when one of said external input and said state of interference corresponds to "suppression"
   when a frequency with which combinations of said external input and the emotion state stored in said surface storage unit are occurred becomes greater than or equal to a prescribed value.

3. A spontaneous emotion model device comprising:
   a spontaneous emotion unit that prepares, as data, a plurality of emotion states in advance, which is obtained by modeling human emotions, and simulates creation of a human spontaneous emotion by causing state transitions to occur repeatedly between said emotion states according to an operation process representing a stochastic model of the Schrodinger equation;
   a surface storage unit that captures, as an external input, a direct or indirect external reaction to one of said emotion states, and stores a combination of said external input and the emotion state for a predetermined period and forgets the combination after said predetermined period has elapsed; and
   a deep consciousness updating unit that simulates growth of deep consciousness by
   increasing probabilities of state transitions to the emotion state of said spontaneous emotion unit when one of said external input and a state of interference of the combination corresponds to "encouragement" and
   decreasing said probabilities of state transitions when one of said external input and said state of interference corresponds to "suppression"
   when a frequency with which combinations of said external input and the emotion state stored in said surface storage unit are occurred becomes greater than or equal to a prescribed value.

4. An inspiration simulation method using a computer comprising the steps of:
   preparing, as data, a plurality of emotion states in advance, which is obtained by modeling human emotions, and simulating creation of a human spontaneous emotion by causing said computer to repeatedly perform operations of state transitions between said emotion states according to an operation process representing a stochastic model of the Schrödinger equation;
   simulating a human inspiration source, which is influenced by sensibility, by classifying externally collected knowledge data in such a manner that they are correlated with degrees of correlation with said emotion states and accumulating said knowledge data in a database on said computer; and
   when an external input is received, simulating human conception by causing said computer to combine said external input with one of said emotion states and to search said database for related knowledge data using, as a search key, one of the combination and a state of interference produced by the combination.

5. The inspiration simulation method according to claim 4, further comprising the step of simulating growth of deep consciousness by causing said computer
   to increase probabilities of state transitions to the emotion state when one of said external input and said state of interference corresponds to "encouragement" and
   to decrease said probabilities of state transitions when one of said external input and said state of interference corresponds to "suppression"
   when said computer judges that a frequency with which combinations of said external input and the emotion state are occurred is greater than or equal to a prescribed value.

6. A spontaneous emotion simulation method using a computer comprising the steps of:
   preparing, as data, a plurality of emotion states in advance, which is obtained by modeling human emotions, and simulating creation of a human spontaneous emotion by causing said computer to repeatedly perform operations of state transitions between said emotion states according to an operation process representing a stochastic model of the Schrödinger equation;
   causing said computer to capture, as an external input, a direct or indirect external reaction to one of said emotion states, and to store a combination of said external input and the emotion state for a predetermined period and forget the combination after said predetermined period has elapsed; and
   simulating growth of deep consciousness by causing said computer
   to increase probabilities of state transitions to the emotion state when one of said external input and a state of interference of the combination corresponds to "encouragement" and
   to decrease said probabilities of state transitions when one of said external input and said state of interference corresponds to "suppression"
   when said computer judges that a frequency with which combinations of said external input and the emotion state are occurred is greater than or equal to a prescribed value.

* * * * *

UNITED STATES PATENT AND TRADEMARK OFFICE
CERTIFICATE OF CORRECTION

PATENT NO. : 7,664,627 B2 Page 1 of 1
APPLICATION NO. : 10/530236
DATED : February 16, 2010
INVENTOR(S) : Shunji Mitsuyoshi It is certified that error appears in the above-identified patent and that said Letters Patent is hereby corrected as shown below:

On the title page item (54) and Col. 1, line 1,

--INSPIRATIONAL MODEL DEVICE, SPONTANEOUS EMOTION MODEL DEVICE, AND RELATED METHODS AND PROGRAMS--

Should read:

INSPIRATION MODEL DEVICE, SPONTANEOUS EMOTION MODEL DEVICE, AND RELATED METHODS AND PROGRAMS

Signed and Sealed this

Sixth Day of July, 2010

David J. Kappos
*Director of the United States Patent and Trademark Office*